United States Patent [19]

Gyugyi et al.

[11] Patent Number: 4,638,238

[45] Date of Patent: Jan. 20, 1987

[54] SWITCHING TECHNIQUE FOR THYRISTOR-SWITCHED CAPACITORS TO ACHIEVE NETWORK DAMPING

[75] Inventors: Laszlo Gyugyi, Penn Hills Township, Allegheny County; Mark G. Gernhardt, Herminie, both of Pa.

[73] Assignee: Westinghouse Electric Corp, Pittsburgh, Pa.

[21] Appl. No.: 787,283

[22] Filed: Oct. 15, 1985

[51] Int. Cl.⁴ .............................................. H02J 3/18
[52] U.S. Cl. ..................................... 323/211; 361/86
[58] Field of Search ............................... 323/208–211; 363/50; 361/78–79, 86, 88, 91

[56] References Cited

U.S. PATENT DOCUMENTS

| | | | |
|---|---|---|---|
| 4,234,843 | 11/1980 | Gyugyi | 323/210 |
| 4,307,331 | 12/1981 | Gyugyi | 323/210 |
| 4,348,631 | 9/1982 | Gyugyi et al. | 323/211 |
| 4,398,141 | 8/1983 | Brennen et al. | 323/211 |
| 4,470,005 | 9/1984 | Gyugyi | 323/210 |
| 4,555,658 | 11/1985 | Häusler et al. | 323/210 |

Primary Examiner—Peter S. Wong
Attorney, Agent, or Firm—M. J. Moran

[57] ABSTRACT

In a static VAR generator for providing reactive power compensation to an ac network and including a thyristor-switched capacitor bank having the series combination of a capacitor, a bidirectional thyristor switch having gate drive, and a current limiting inductor with an applied voltage appearing across the combination with a current being conducted therethrough, a damping circuit and method for switching the thyristor switch to achieve damping of oscillatory transients generated by the switching of the capacitor in the network, comprising:

determining the magnitude and polarity of a voltage difference $\Delta v$ between the applied voltage V and the voltage across the capacitor Vc;

determining the occurrence of the prepeak quadrant and the postpeak quadrant of the applied voltage V;

removing the gate drive of the thyristor
  (a) during the prepeak quadrant of the applied voltage when the polarity of V is opposite to the polarity of the applied voltage;
  (b) during the postpeak quadrant of the applied voltage when the polarity of V is the same as that of the applied voltage; and applying the gate drive of the thyristor
  (a) during the prepeak quadrant of the applied voltage when the polarity of V is the same as the polarity of the applied voltage;
  (b) during the postpeak quadrant of the applied voltage when the polarity of V is opposite to that of the applied voltage; and
  (c) at the occurrence of the voltage peak of the applied voltage whereby the enabling and disabling of the gate drive means by the gate drive enabling means provides damping of oscillations of the ac network caused by the switching of the capacitor.

8 Claims, 15 Drawing Figures

SWITCHING TECHNIQUE FOR THYRISTOR-SWITCHED CAPACITORS TO ACHIEVE NETWORK DAMPING

FIELD OF THE INVENTION

The invention is related to static VAR generators and in particular static VAR generators employing thyristor-switched capacitors.

BACKGROUND OF THE INVENTION

Figure 1:
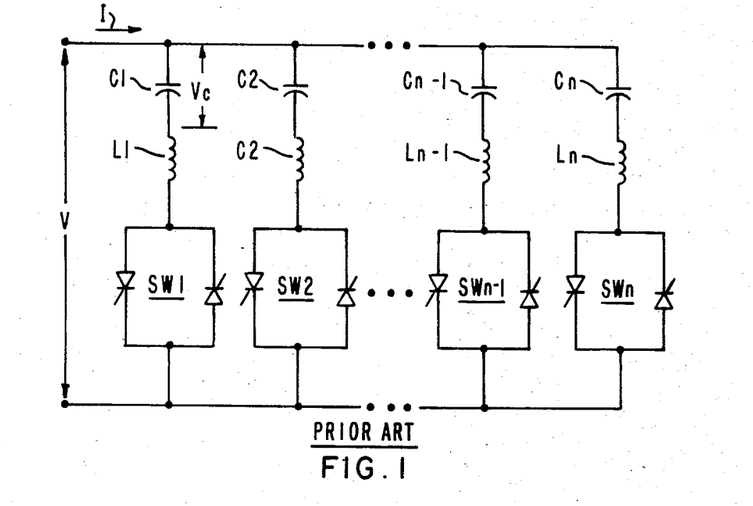
FIG. 1 is an example of the prior art illustrating a thyristor-switched capacitor bank.

A static VAR generator using thyristor-switched capacitors is described in U.S. Pat. No. 4,234,843 issued Nov. 18, 1980 and entitled "Static VAR Generator With Discrete Capacitive Current Levels" and a control scheme for this is detailed in U.S. Pat. No. 4,307,331, issued Dec. 22, 1981 and entitled "Hybrid Switched-Capacitor Controlled-Inductor Static VAR Generator and Control Apparatus". As known, in this type of static VAR generator a number, in general n, of capacitor banks is employed across an ac electrical network as illustrated in FIG. 1. Each capacitor bank includes the series combination of a capacitor, Cn, a bidirectional thyristor-switch, SWn, and a surge current limiting inductor, Ln. The capacitor bank with the series inductor can be switched to the ac supply network without any transient if the capacitor is charged to a specific voltage, which is the amplitude of the steady-state ac voltage across the capacitor bank in conduction, and the switching takes place exactly at the peak of the ac supply voltage. This ideal switching condition is satisfied in practice only if the capacitor bank is switched back to the network shortly (within a few cyles) after it was disconnected, that is, before the capacitor residual charge could change appreciably. At disconnection under ideal switching conditions, the capacitor is charged to the peak of the ac network voltage and discharges from this value slowly via the internal discharge resistance of the capacitor. Eventually the capacitor will reach a completely discharged condition.

Figure 2:
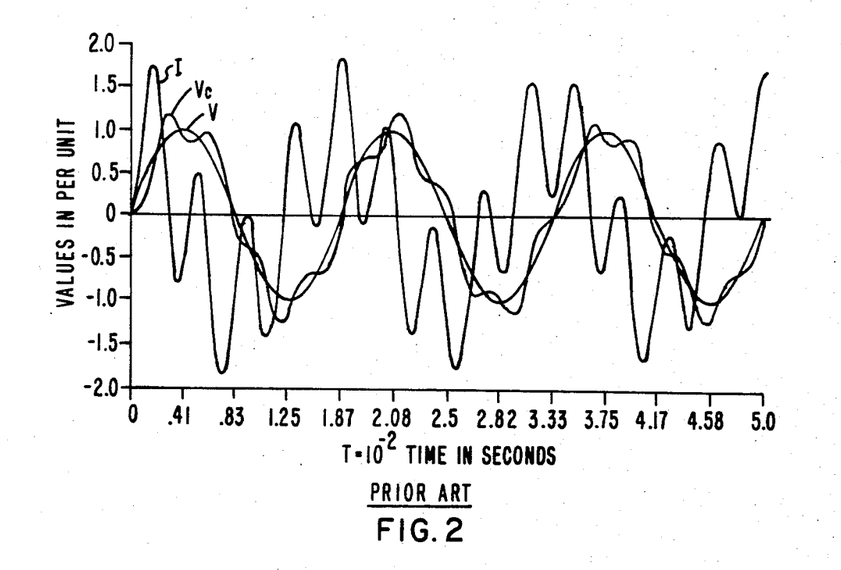
FIG. 2 illustrates the current applied voltage and capacitor voltage waveforms of the thyristor-switched capacitor of FIG. 1.
Figure 3A:
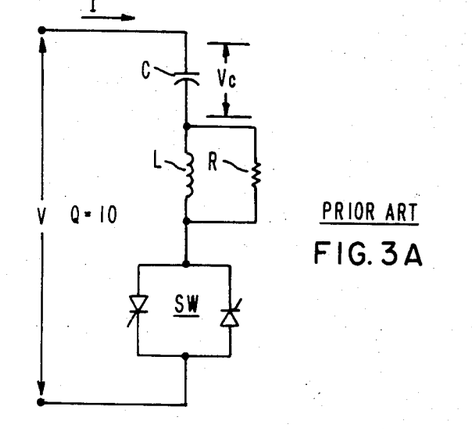
FIG. 3A is an example of the prior art thyristor-switched capacitor bank using a damping resistor and FIG. 3B illustrates the current applied voltage and capacitor voltage waveforms for the circuit of FIG. 3A.
Figure 3B:
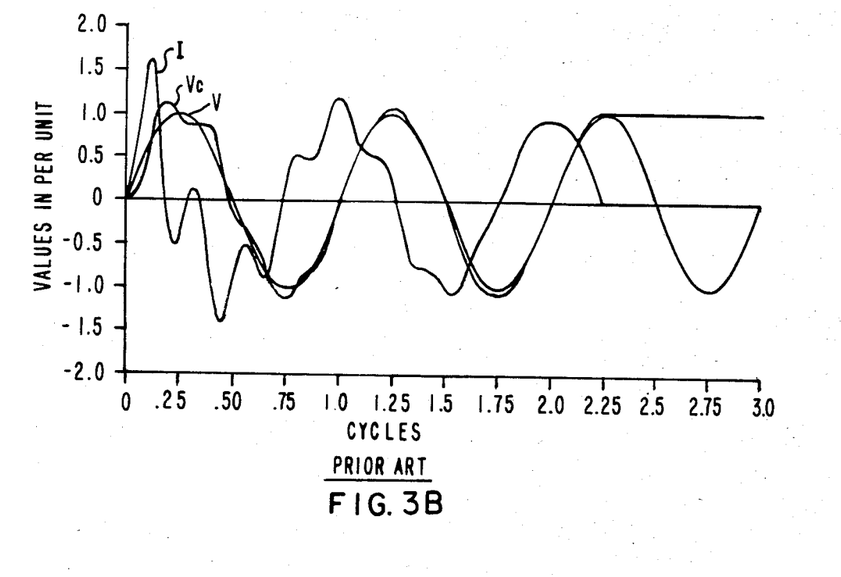

Switching of the capacitor bank to the ac electrical network when it is fully or partially discharged will generate an oscillatory transient. This transient can be minimized, but not eliminated, by initiating the capacitor switching at the time instant when the capacitor voltage and the ac voltage are approximately equal, that is, when the voltage across the thyristor switch is approximately zero. If the LC circuit formed from the capacitor and the surge current limiting inductor has a high quality factor (or Q factor) then the oscillatory disturbance due to the non-ideal switching conditions would exist for a long time. An oscillatory transient in the capacitor voltage Vc due to switching in a high Q thyristor-switched capacitor circuit with a discharged capacitor is illustrated in FIG. 2. The current I and ac network voltage V waveforms are also shown. The long oscillatory disturbance in the capacitor voltage Vc, which can have a large amplitude under particular switching conditions, can cause a severe distortion in the network voltage, control problems for the VAR generator, and increased stresses for the power components of the VAR generator and of the ac network. To avoid these problems, the surge current limiting reactor is normally shunted by a damping resistor, R, as shown in FIG. 3A, to reduce the Q factor of the thyristor-switched capacitor circuit. In this way the oscillatory transient in the voltage Vc decays relatively quickly, as illustrated in FIG. 3B for the previous example of switching-in a discharged capacitor bank. However, the damping resistor, R, which has to be rated for high transient voltage and relatively high power dissipation, increases the cost and reduces the efficiency of the static VAR generator appreciably. Accordingly, it would be advantageous to be able to eliminate the need for the damping resistor. It is one object of the present invention to provide a switching technique for a thyristor-switched capacitor that would achieve trasient damping without the use of a damping resistor resulting in reduced cost and increased efficiency for the static VAR generator.

SUMMARY OF THE INVENTION

The invention is a method and circuit for switching capacitors to an electrical network so that the generator oscillatory disturbance rapidly decays without the use of an expensive and lossy damping resistor. The technique improves performance, and reduces cost and losses of static VAR generators employing thyristor-switched capacitors.

The method and circuit are used with an ac network having an applied voltage across a capacitor bank comprising the series combination of a capacitor, a bidirectional thyristor switch having gate drive, and a current limiting reactance (inductor). The method of switching the thyristor switch to achieve damping of oscillatory transients generated by the switching of the capacitor in the network comprises:

measuring the magnitude and polarity of the voltage Vc appearing across the capacitor;

measuring magnitude and polarity of the applied voltage V;

determining the magnitude and polarity of a voltage difference $\Delta v$ defined by the formula $\Delta v = (V - Vc)$;

determining the occurrence of the prepeak quadrant and the postpeak quadrant of the applied voltage;

removing the gate drive of the thyristor during the occurrence of the following conditions:
  (a) during the prepeak quadrant of the applied voltage when the polarity of $\Delta v$ is opposite to the polarity of the applied voltage;
  (b) during the postpeak quadrant of the applied voltage when the polarity of $\Delta v$ is the same as that of the applied voltage; and applying the gate drive of the thyristor during the occurrence of the following conditions:
  (a) during the prepeak quadrant of the applied voltage when the polarity of $\Delta v$ is the same as the polarity of the applied voltage;
  (b) during the postpeak quadrant of the applied voltage when the polarity of $\Delta v$ is opposite to that of the applied voltage;
  (c) at the occurrence of the voltage peak of the applied voltage.

The application and removal of the gate drive in accordance to these five rules provides damping of oscillations of the ac network caused by the switching of the capacitor without the need for a damping resistor.

BRIEF DESCRIPTION OF THE DRAWINGS

For a better understanding of the invention, reference may be made to the embodiments exemplary of the invention shown in the accompanying drawings, wherein:

FIGS. 4A, 5A, 6A and 7A illustrate the undamped thyristor-switched capacitor and are shown for reference purposes while

DETAILED DESCRIPTION

Damping of the transient associated with the switching of a capacitor bank can be achieved by allowing the thyristor switch to interrupt conduction at appropriate current zero crossings and refiring it at particular time instants following such a current zero crossing.

Five rules, stated hereinafter, will ensure the rapid damping of the transient generated by capacitor bank switching. The first two rules specify the conditions for allowing the thyristor switch to turn-off, that is, conditions for removing the gate drive from the thyristors. One of these rules apply in the prepeak quadrant of the applied ac voltage, the other one in the postpeak quadrant. The prepeak quadrant begins at a network voltage zero crossing and ends at the next network voltage peak. The postpeak quadrant begins at a network voltage peak and ends at the next network voltage zero crossing.

1. Prepeak Quadrant Gate Drive Removal Rule

If the applied ac voltage V across the thyristor-switched capacitor circuit is in a prepeak quadrant and if the polarity of the difference $\Delta v$ between the applied ac voltage V and the capacitor voltage Vc (that is, the polarity of the inductor voltage) is opposite to the polarity of the applied ac voltage V, then stop the gate drive to the thyristors allowing the thyristor switch to turn-off at the next current zero crossing.

2. Postpeak Quadrant Gate Drive Removal Rule

If the applied ac voltage V across the thyristor-switched capacitor circuit is in a postpeak quadrant and if the polarity of the difference $\Delta v$ between the applied ac voltage V and the capacitor voltage Vc (that is, the polarity of the inductor voltage) is the same as the polarity of the applied ac voltage V, then stop the gate drive to the thyristors allowing the thyristor switch to turn-off at the next current zero crossing.

The following three rules specify the instants of time at which the gate drive to the thyristor has to be reapplied to turn the thyristor switch on, in order to achieve damping. The conditions for reapplying gate drive in the prepeak and postpeak quadrants are opposite of those specifying the removal of the gate drives in the same quadrants.

3. Prepeak Quadrant Gate Drive Reapplication Rule

If the applied ac voltage V across the thyristor-switched capacitor circuit is in a prepeak quadrant and if the polarity of the difference $\Delta v$ between the applied ac voltage V and the capacitor voltage Vc is the same as the polarity of the applied ac voltage V, then reapply gate drive to turn on the thyristor switch.

4. Postpeak Quadrant Gate Drive Reapplication Rule

If the applied ac voltage V across the thyrsitor-switched capacitor circuit is in a postpeak quadrant and if the polarity of the difference $\Delta v$ between the applied ac voltage V and the capacitor voltage Vc is the opposite of the polarity of the applied ac voltage V, then reapply the gate drive to turn on the thyristor switch.

5. At Peak Gate Drive Reapplication Rule

Gate drive always is to be applied at the peak of the applied ac voltage V.

Figure 4A:
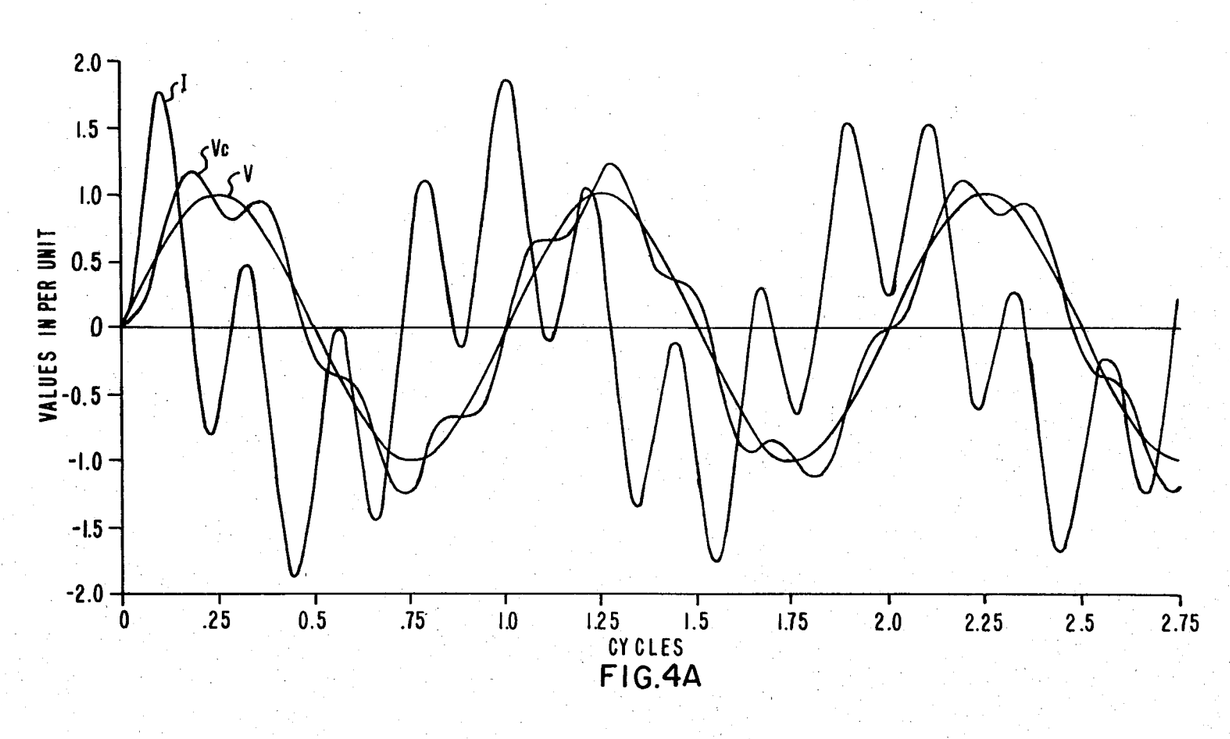
Figure 4B:
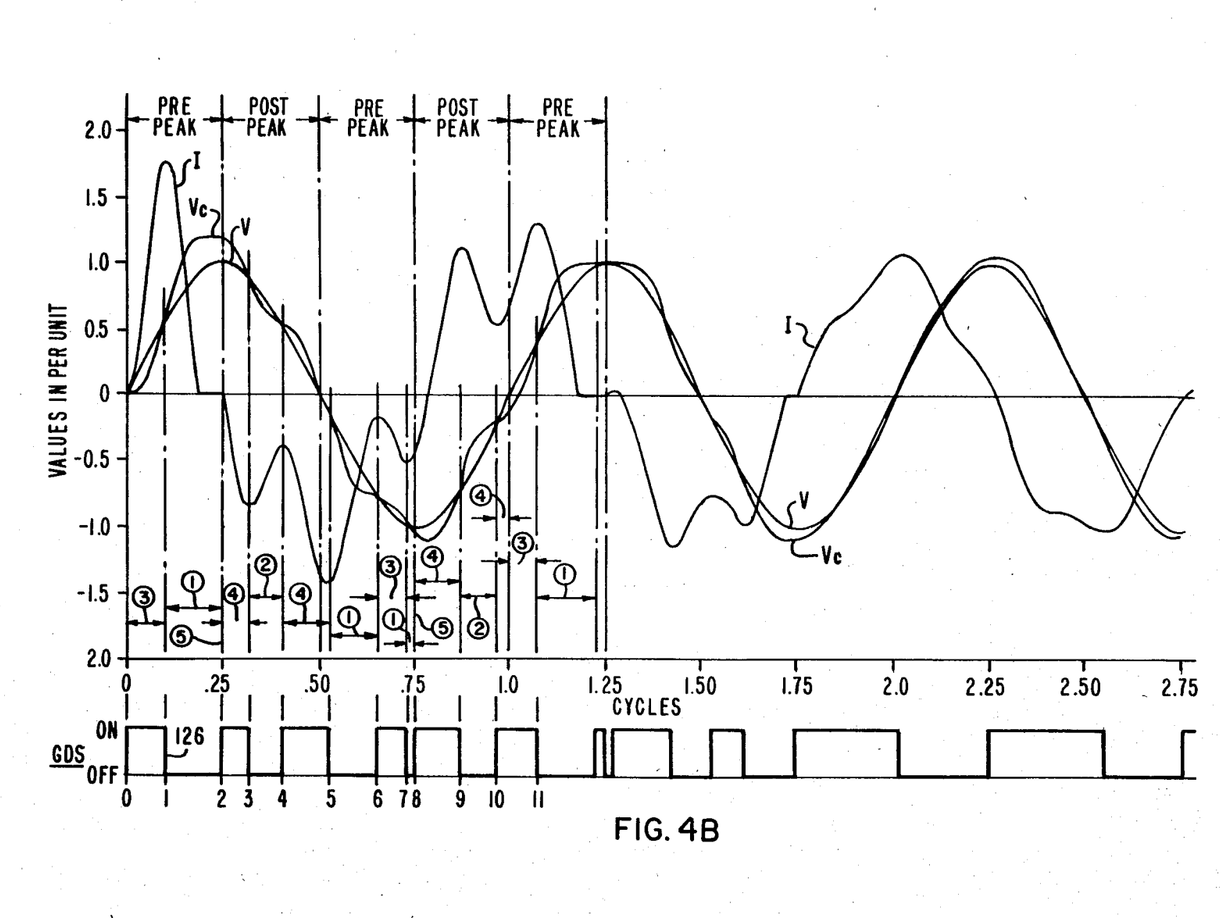
FIGS. 4B, 5B, 6B and 7B illustrate the current applied voltage and capacitor voltage waveforms utilizing the switching technique of the present invention for various degrees of capacitor charging.
Figure 5A:
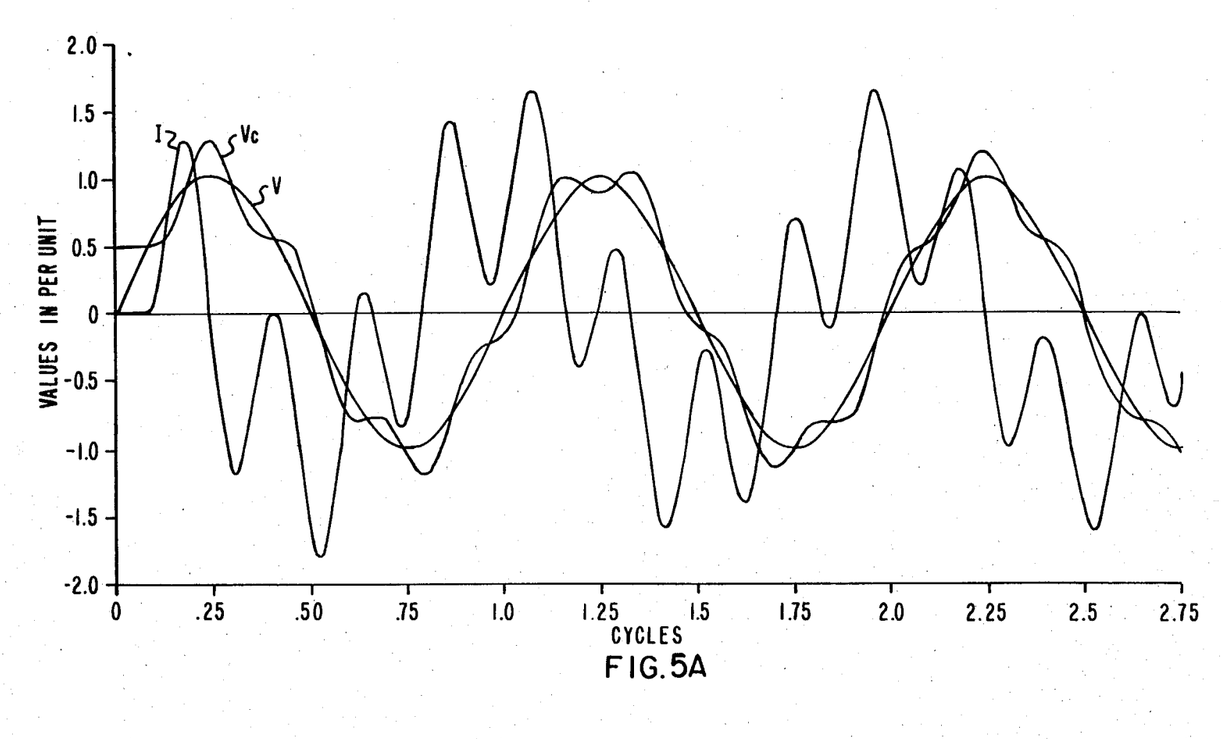
Figure 5B:
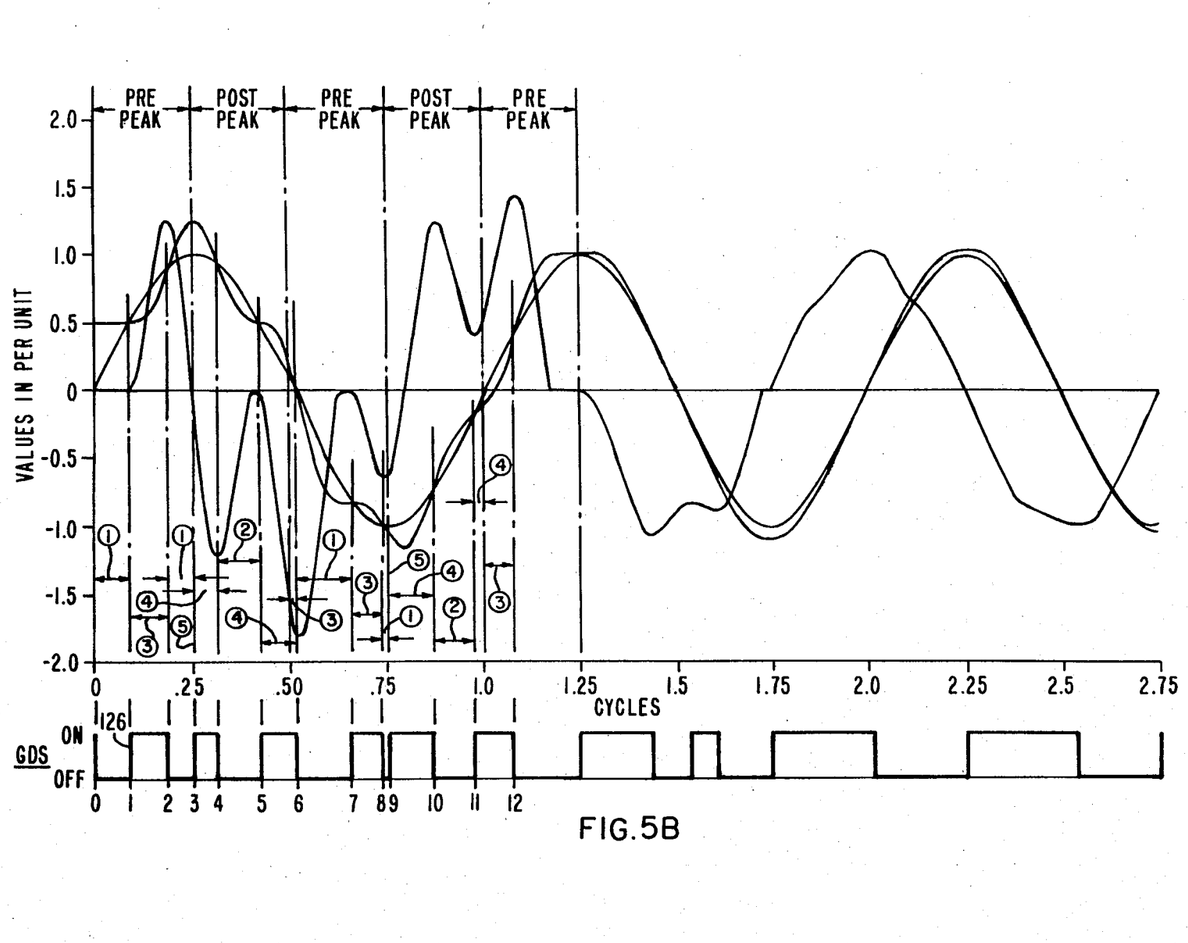

The application of these rules are demonstrated by the following examples of capacitor switching illustrated in FIGS. 4A, 4B, 5A, 5B, 6A, 6B, 7A and 7B. In each of these figures, part A presents for reference purposes the applied voltage V, the capacitor voltage Vc, and the current I waveforms for the undamped capacitor bank circuit of FIG. 1. In part B of each of the figures, the waveforms for the capacitor voltage Vc, the applied network voltage V, and the current I flowing in the tyristor-switched capacitor circuit obtained with the switching technique specified by the five rules are shown together with the gate drive signal, GDS, controlling the thyristor switch. The gate drive signal is shown as a logic signal having the values of 1 or 0 where 1 represents the application of gate drive and 0 represents the removal of gate drive. The numbers within the balloons refer to the rule number that is being applied to control the gate drive signal. The balloons are used only for the first cycle of the waveforms. In each of these figures, the initial charge of the capacitor, given as a per unit value of the capacitor rating, is different. In FIGS. 4A and 4B the capacitor is discharged. In FIGS. 5A and 5B the capacitor carries a 0.5 per unit charge; in FIG. 6 the charge is about 0.9 per unit; in FIGS. 7A and 7B the charge is 1.0 per unit.

The first example is the switching of a discharged capacitor bank to the ac network as illustrated in FIGS. 4A and 4B. The voltage and current waveforms corresponding to this example are also shown in FIG. 2 for an undamped circuit, and in FIG. 3B for conventionally damped circuit, where damping is provided by a resistor across the surge current limiting inductor.

In FIG. 4B, the initial switching takes place at zero switch voltage (as set forth previously this is the correct instant of switching a discharged capacitor to minimize the switching transients generated). This is shown at the point O. In the interval between points 0 and 1, the difference, $\Delta v$, between the applied ac voltage, V, and the capacitor voltage, Vc, is positive, $\Delta v = V - Vc > 0$, the applied ac voltage V is in the prepeak quadrant and positive. Therefore, per prepeak quadrant rule 3, the gate drive signal, GDS, is applied. In the interval between points 1 and 2, $\Delta v$ becomes negative, $\Delta v = V - Vc < 0$, while the applied voltage V remains positive, $V > 0$. Therefore, per prepeak quadrant rule 1, the gate drive signal is removed. The thyristor switch stops conducting at the first current zero in this interval. At the peak of the applied ac voltage, at point 2, the gate drive signal, per rule 5, is applied. In the interval between points 2 and 3, $\Delta v$ is negative, $\Delta v = V - Vc < 0$ while the applied voltage V is positive, $V > 0$. Per postpeak quadrant rule 4, the gate drive signal is applied. At point 3 $\Delta v$ is positive, $\Delta v = V - Vc > 0$. Per postpeak quadrant rule 4, the gate drive signal is applied. At point 3 $\Delta v$ is positive, $\Delta v = V - Vc > 0$ and the applied voltage V is positive, V<0. Per postpeak quadrant rule 2, the gate drive signal is stopped. However, since the current does not cross zero in this interval, the thyristor switch stays in conduction. At point 4 $\Delta v$ becomes negative, $\Delta v = V - Vc < 0$ while the applied voltage V is positive, V>0. Per postpeak quadrant rule 4, the gate drive signal is reapplied. At point 5 the applied voltage V has reentered a prepeak quadrant and $\Delta v$ becomes positive, $\Delta v = V - Vc > 0$, while the applied voltage V is negative, V<0. Per prepeak quadrant rule 1, the gate drive signal is stopped. At point 6 $\Delta v$ becomes negative, $\Delta v = V - Vc < 0$ and the applied voltage V is negative, V<0. Per prepeak quadrant rule 3, the gate drive signal is reapplied. At point 7 $\Delta v$ becomes positive, $\Delta v = V - Vc > 0$ and the applied voltage V is negative, V<0. Per prepeak quadrant rule 1, the gate drive signal is stopped. At point 8, the negative peak of the applied voltage V occurs and per rule 5 the gate drive signal is reapplied. In the interval between points 8 and 9 $\Delta v$ becomes positive, $\Delta v = V - Vc > 0$ and the applied voltage V is negative, V<0. Per postpeak quadrant rule 4, the gate drive signal continues. At point 9 $\Delta v$ becomes negative, $\Delta v = V - Vc > 0$ and the applied voltage V is negative, V<0. Per postpeak quadrant rule 2, the gate drive signal is stopped. At point 10 $\Delta v$ becomes positive, $\Delta v = V - Vc > 0$ while the applied voltage V is negative, V<0. Per postpeak quadrant rule 4, the gate drive signal is reapplied. Between points 10 and 11 a voltage zero occurs for the applied voltage V. Because Vc is less than V after the zero crossing point, per prequadrant rule 3 the gate drive signal continues to be applied. At point 11 the polarity of $\Delta v$ is opposite to the applied voltage V. Per rule 1 the gate drive signal is stopped. The similar application of five rules to the control of the thyristor switch can be observed in the remaining quadrants of the applied ac voltage V in FIG. 4B.

Comparison of the waveforms in FIG. 4B to those in 4A clearly show that the switching method results in a very effective circuit damping without the use of a damping resistor. Actually, the comparison of the waveforms in FIG. 4B to those in FIG. 3B indicate that the effective damping achieved with the proposed switching technique is similar to that obtained with a resistor that reduced the Q factor of the circuit to a value of about 10.

Figure 6A:
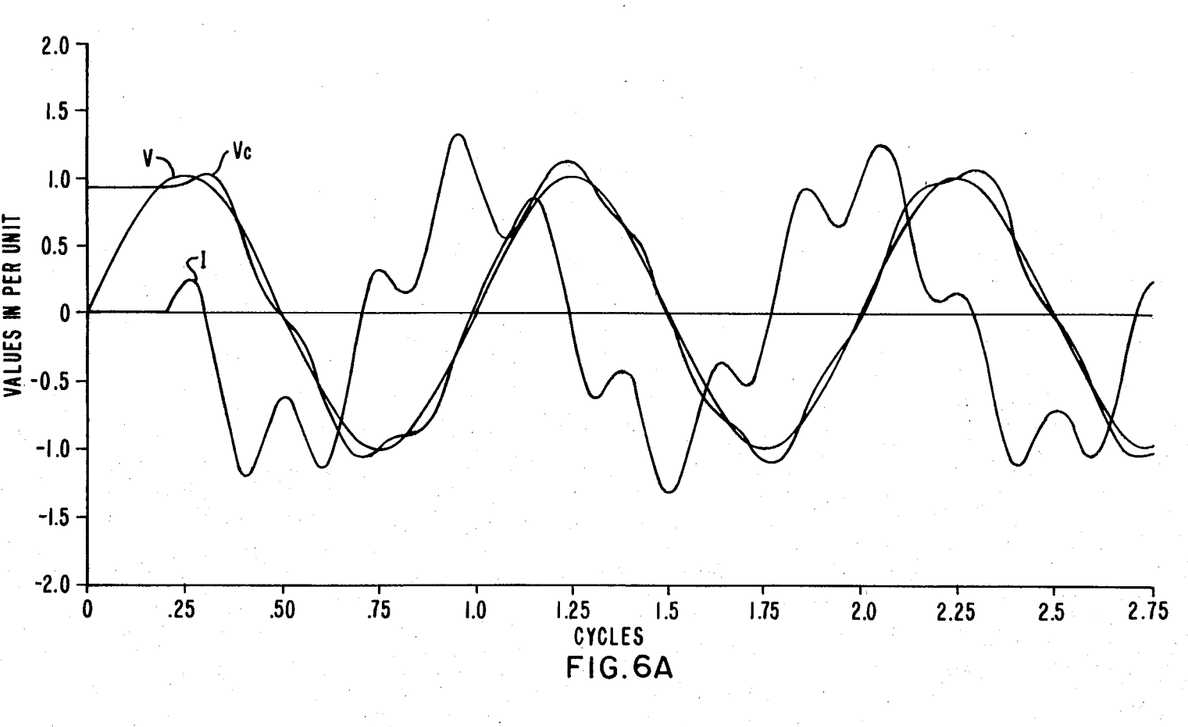
Figure 6B:
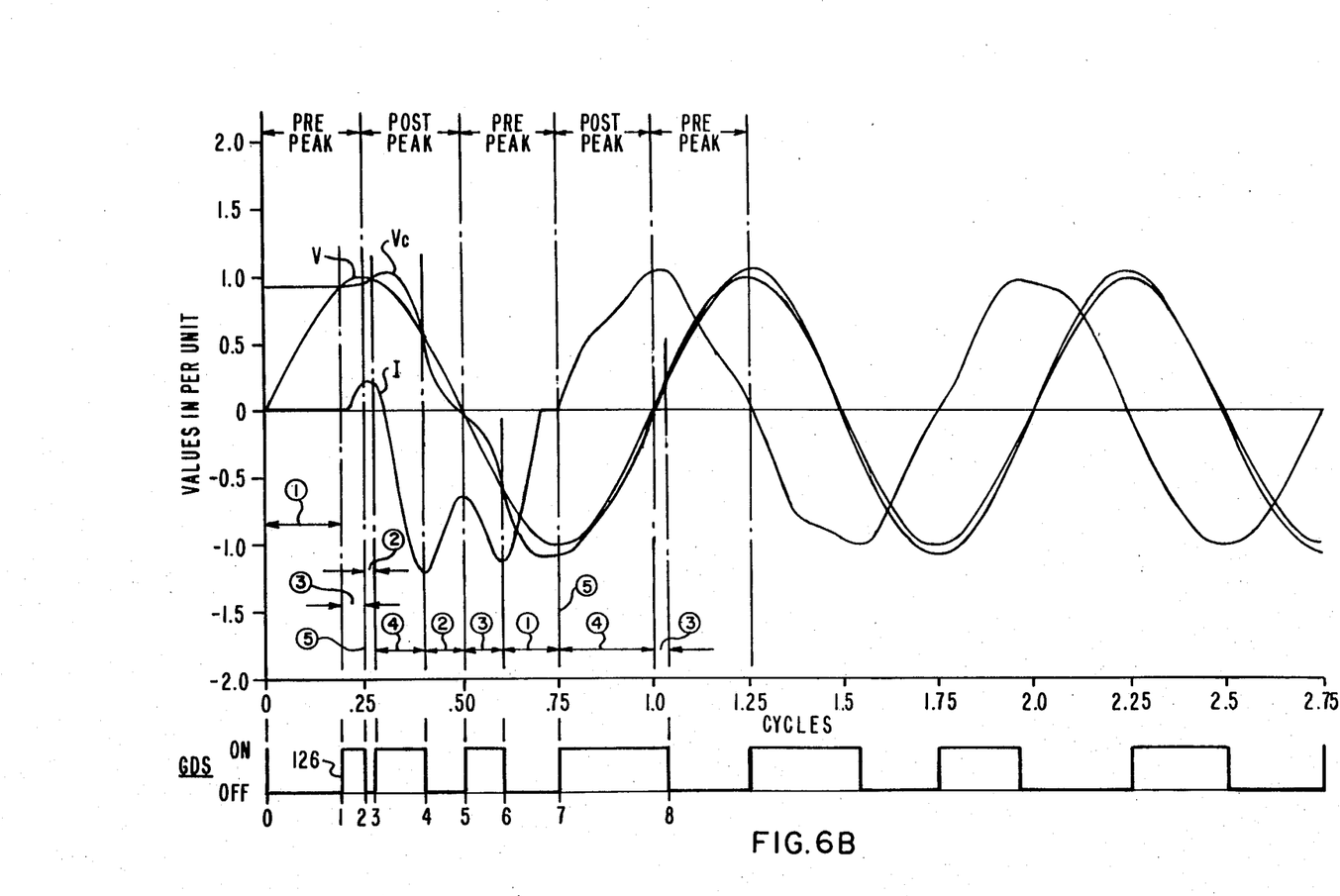
Figure 7A:
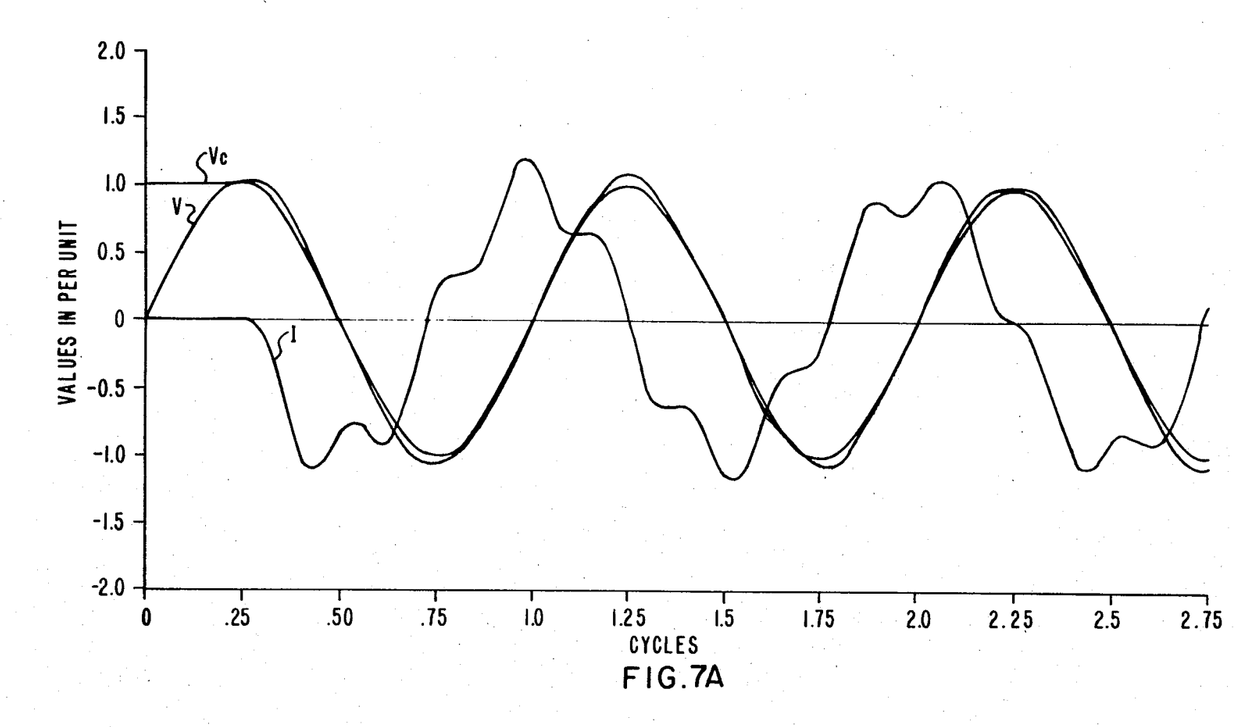
Figure 7B:
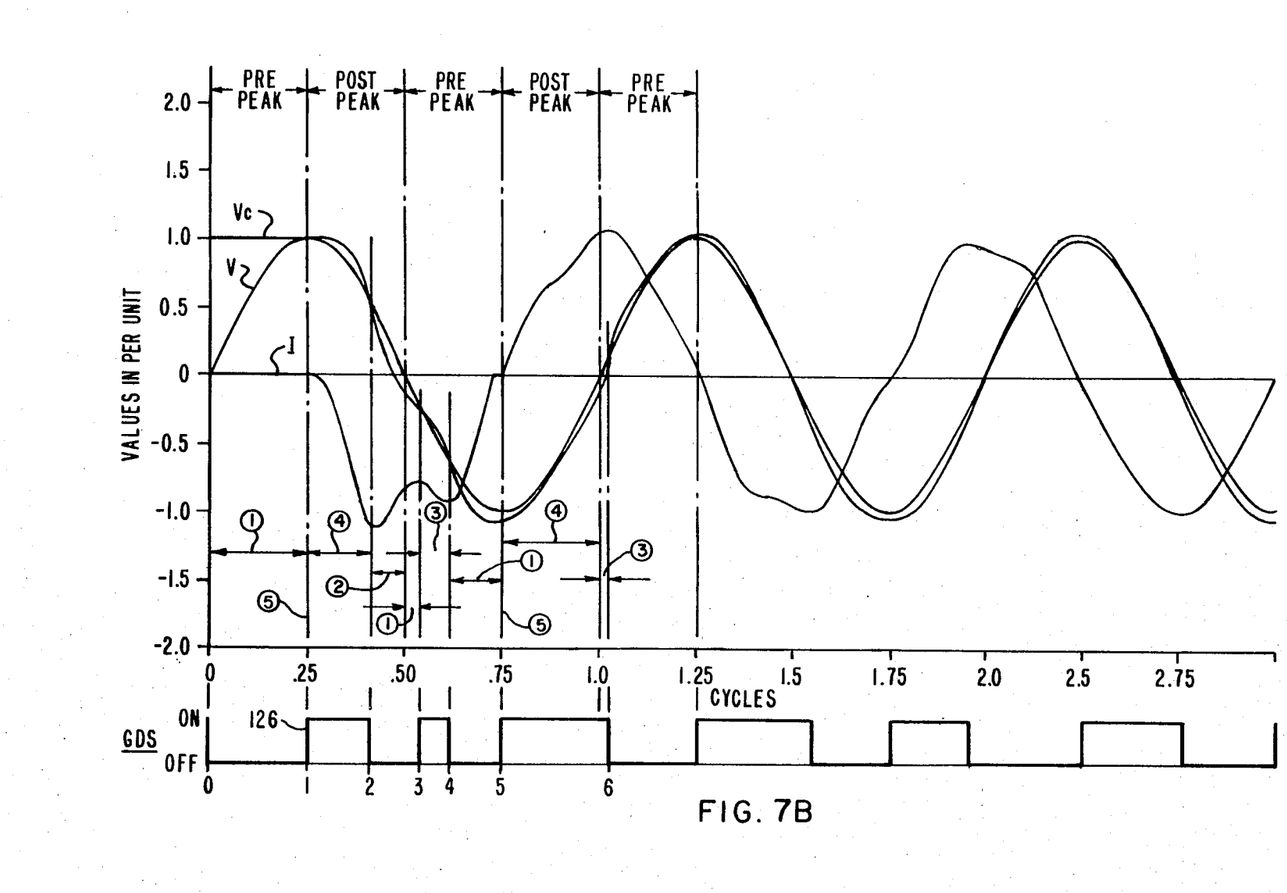

FIGS. 5B, 6B and 7B illustrate the application of the proposed switching technique to cases in which the capacitor bank is charged to different voltage levels and thus the initial switching, executed when the switch voltage is zero, takes place at different time instants. Similar application of five rules to the control of the thyristor switch can be performed to develop the gate drive signal, GDS, shown in part B of each of the figures. These figures clearly demonstrate that the proposed switching technique provides an effective damping in all cases. It can be seen in part A of the FIGS. 4-7 that without the use of the switching technique described, the oscillation in both the current and capacitor voltage waveforms is readily apparent.

It should be appreciated that the five rules prescribed for damping a thyristor-switched capacitor circuit can be changed in a number of ways without affecting the basic principles of the method disclosed. For example, the removal of the gate drive from the thyristor switch is not necessary if subsequent current zero crossing in that pre- or postpeak quadrant is not expected. Thus, the rules specified for gate drive removal could be tied to an auxiliary condition of low circuit current. This corollary would be that the gate drive is removed only if the conditions given for drive removal are met and the current through the thyrsitor-switched capacitor circuit is below a given predetermined level so that current zero crossings can be expected. Another possible modification is to use the capacitor switching rules described only during the first few cycles, after the initial switching, to achieve the desired damping. Once the capacitor circuit is in a steady-state condition, continuous gate drive to the thyristor switch is applied. These, and similar modifications, would not change the basic principles established for damping thyristor-switched capacitor circuits, but they could significantly change the appearance of the waveform representing the gate drive signal, GDS, of the thyristor switch. However, it is to be recognized that similar operation of the thyristor switch can be accomplished with different gate drive signals.

Figure 8A:
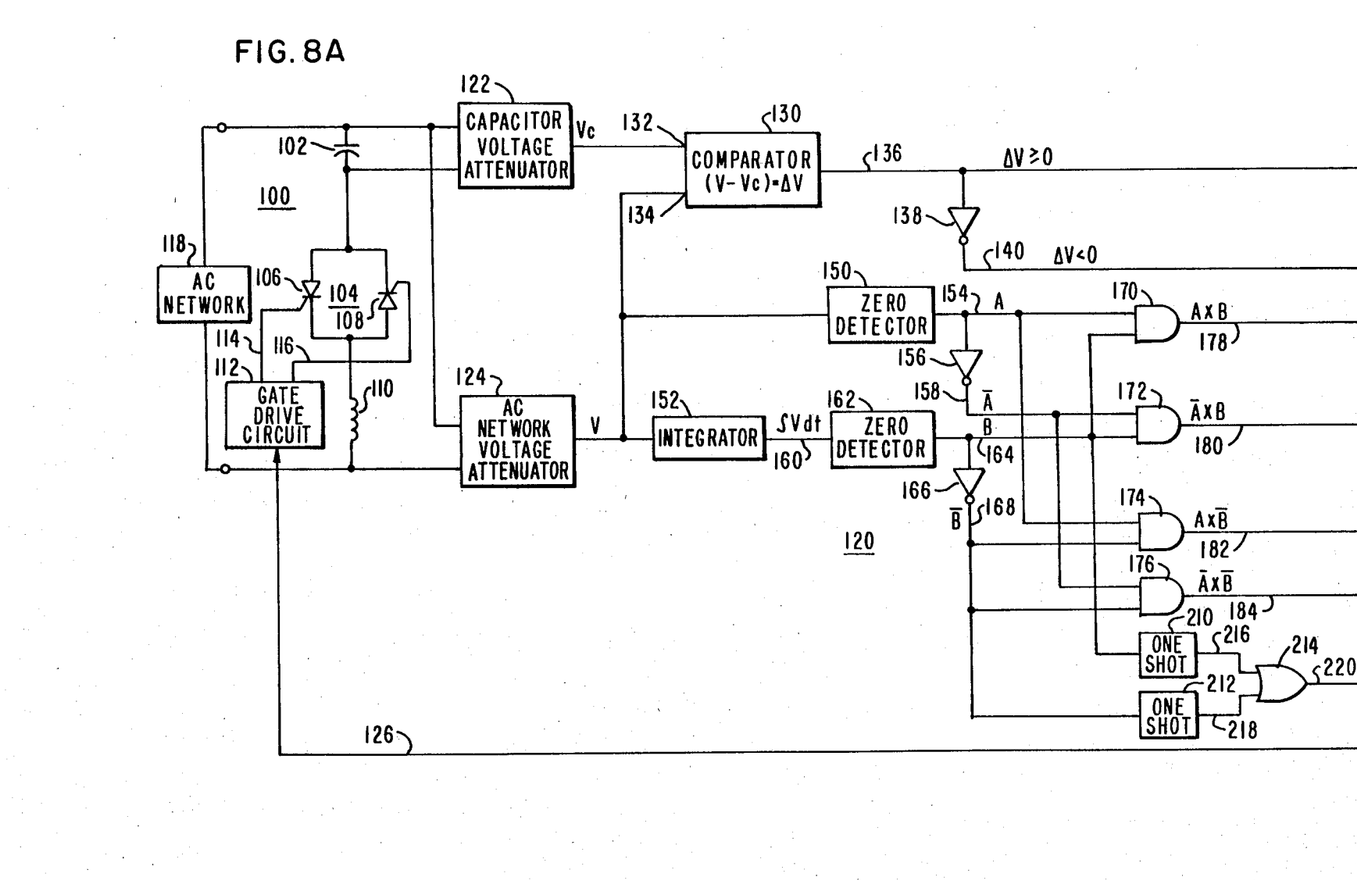
FIGS. 8A and 8B are a combination block diagram schematic illustrating a circuit embodying the switching technique of the present invention.
Figure 8B:
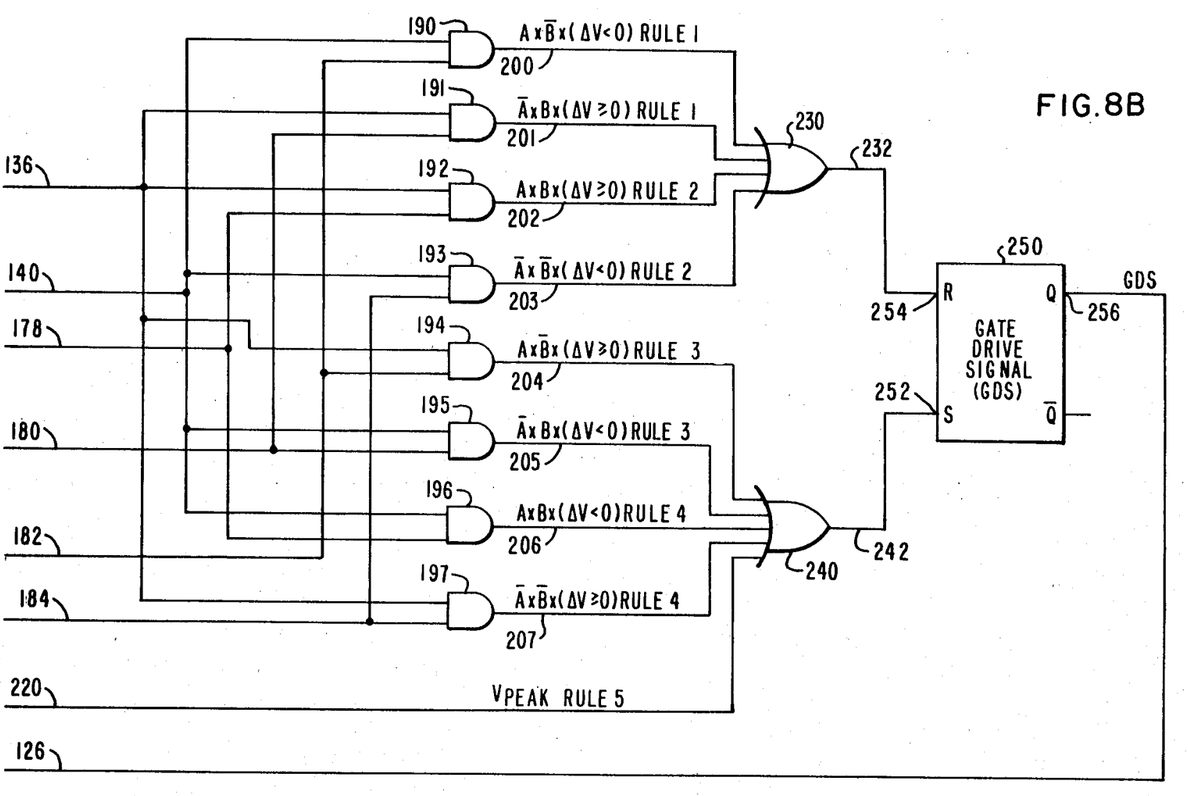

A circuit implementation of the capacitor switching technique is shown in the form of a block diagram in FIGS. 8A and 8B. The operation of the circuit is illustrated by the waveform diagrams shown in FIG. 9.

The circuit shown in FIGS. 8A and 8B is a block diagram of one implementation for the capacitor switching method. A thyristor-switched capacitor bank 100 comprised of the series combination of a capacitor 102, a bidirectional thyristor switch 104 composed of thyristors 106 and 108 and a surge current limiting inductor 110 is shown. A gate drive circuit 112 is shown connected to the gates 114 and 116 of the thyristors 106 and 108, respectively. The gate drive circuit 112 is used to generate the required gate drive pulses used for firing the thyristors 106 and 108 for switching the capacitor 102 into and out of an ac network 118 in response to a gate drive signal, GDS. Typically, the GDS is generated by a control circuit (not shown) in the static VAR generator control in response to the reactive power requirements of the electrical network 118. Once the signal for switching the capacitor into the circuit is received, the GDS used for the switching of the capacitor is provided by a damping circuit 120 operating according to the five switching rules.

Figure 9:
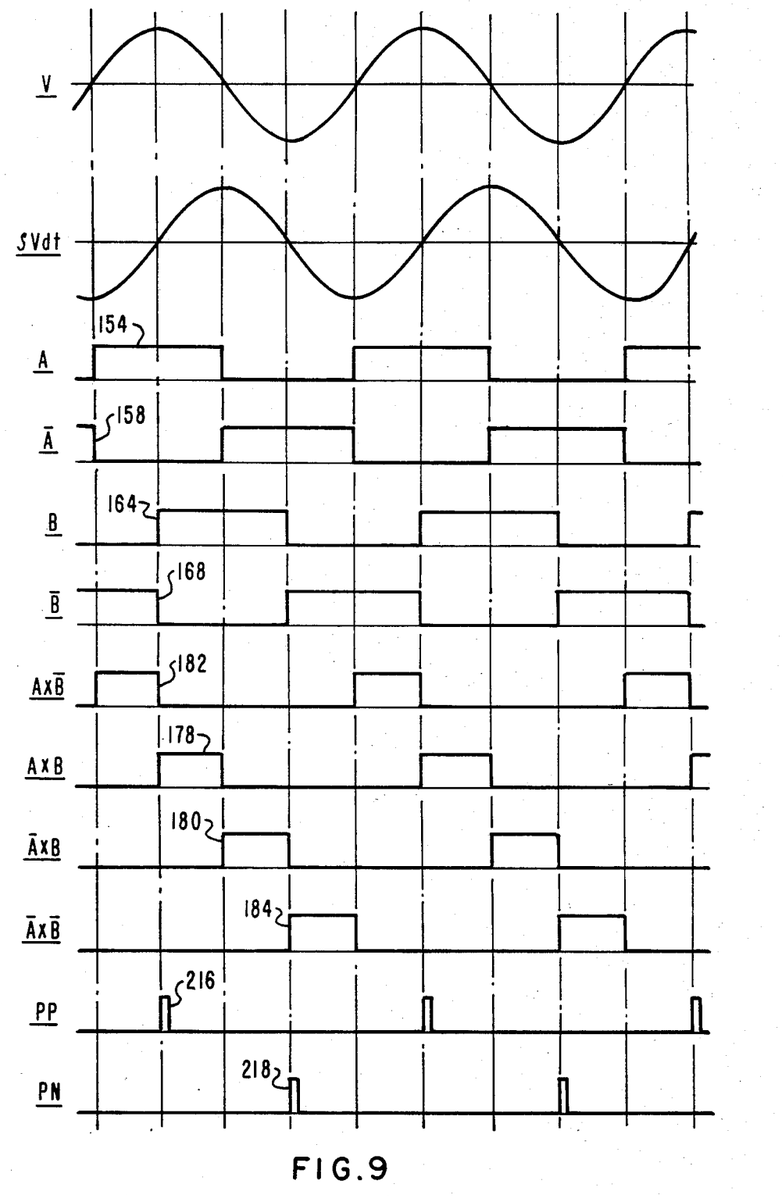
FIG. 9 illustrates the waveforms and logic signals for the circuit of FIGS. 8A and 8B.

In the damping circuit 120, a capacitor voltage attenuator 122 connected across the capacitor 102 and an ac network voltage attenuator 124 connected across the capacitor bank 100 are used to provide a measurement of the capacitor voltage Vc and the network applied voltage V, respectively. These two signals are used to develop the GDS output 126 of the damping circuit 120 and are connected to the comparator 130 at its inputs 132 and 134, respectively. The output 136 of the comparator 130 is a signal $\Delta v$ which is the difference between the applied voltage V and the capacitor voltage Vc, i.e. $\Delta v = (V - Vc)$. Also connected to the output 136 of the comparator 130 is an inverter 138 which provides at its output 140 an inverted version of the signal $\Delta v$. The inverter 138 is used solely to provide a positive logic signal when $\Delta v$ is less than zero. Thus, in the remainder of the damping circuit 120 the output 136 of the comparator 130 is used when $\Delta v$ is equal or greater than zero while the output 140 of the inverter 138 is used when $\Delta v$ is less than zero. The output of the ac system voltage attenuator 124 is also connected as an input to a zero detector 150 and an integrator 152. The zero detector 150 is used to produce two square waves A and $\overline{A}$ representing the positive half cycle of and negative half cycle of the applied ac voltage V of the ac network 118. The output 154 of the zero detector 150 produces the square wave for the positive half cycle A. The negative half cycle $\bar{A}$ is provided at the inverter 156 at its output 158. The output 160 of the integrator 152 produces a sinusoidal waveform which is shifted 90 degrees with respect to the applied voltage V waveform. This phase shifted signal $\int Vdt$ is provided as the input to a second zero detector 162 whose output 164 again is a square wave B which represents the positive half cycle of the phase shifted waveform. A third inverter 166 connected to the output 164 of the zero detector 162 produces as an output 168 a square wave $\bar{B}$ that represents the negative half cycle of the phase shifted ac voltage $\int Vdt$. The waveforms for the six signals V, $\int Vdt$, A, $\bar{A}$, B and $\bar{B}$ are shown in FIG. 9.

Four dual input AND gates 170, 172, 174, and 176 are used to provide logic signals representing the prepeak and postpeak quadrants. The signal A, 154 is connected to one of the inputs to AND gates 170 and 174. The signal $\bar{A}$ is connected to one of the inputs of AND gates 172 and 176. The signal B is connected to the other inputs of AND gates 170 and 172 and the signal $\bar{B}$ is connected to the other inputs of AND gates 174 and 176. The output 178 of AND gate 170 represents the logical combination of A and B. The output 180 of AND gate 172 represents the logical combination of $\bar{A}$ and B. The output 182 of AND gate 174 represents the logical combination of A and $\bar{B}$. The output 184 of AND gate 176 represents the logical combination of $\bar{A}$ and $\bar{B}$. These outputs represent the pre- and postquadrants of the positive and negative half cycles of the applied network voltage. The positive prepeak quadrant is represented by the output 182 (A x $\bar{B}$) while the positive postpeak quadrant is represented by the output 178 (A x B ). The negative prepeak quadrant is represented by the output 180 ($\bar{A}$ x B) and the negative postpeak quadrant is represented by the output 184 ($\bar{A}$ x $\bar{B}$). These four outputs along with the outputs 136 and 140 representing $\Delta v$, the difference between the applied voltage V and the capacitor voltage Vc, are applied as inputs to an array of AND gates to produce rules 1 through 4 of the switching method.

The AND gate array comprises eight dual input AND gates 190–197. Connected to the inputs of AND gate 190 are the output 182 of AND gate 174 and the output 140 of the inverter 138. Connected to the inputs of AND gate 191 are the output 136 of the comparator 130 and the output 180 of AND gate 172. Connected to the inputs of AND gate 192 are the output 136 of the comparator 130 and the output 178 of AND gate 170. Connected to the inputs of AND gate 193 are the output 184 of AND gate 176 and the output 140 of the inverter 138. Connected to the inputs of AND gate 194 are the output 136 of the comparator 130 and the output 182 of AND gate 174. Connected to the inputs of AND gate 195 are the output 180 of AND gate 172 and the output 140 of the inverter 138. Connected to the inputs of AND gate 196 are the output 178 of AND gate 170 and the output 140 of the inverter 138. Connected to the inputs of AND gate 197 are the output 136 of the comparator 130 and the output 184 of AND gate 176.

The output 200 of AND gate 190 represents the application of rule 1 for the removal of gate drive during the positive prepeak quadrant of the applied network voltage V. The output 201 of AND gate 191 also represents the application of rule 1 but to the negative prepeak quadrant. The outputs 202 and 203 of AND gates 192 and 193, respectively, represent the application of rule 2 for the removal of gate drive for the postpeak quadrants of the positive and negative half cycles, respectively, of the network voltage. The output 204 of AND gate 194 represents the application of rule 3 for applying gate drive during the positive prepeak quadrant. The output 205 of AND gate 195 also represents the application of rule 3 but to the negative prepeak quadrant. The outputs 206 and 207 of AND gates 196 and 197, respectively, represent the application of rule 4 for providing gate drive for the postpeak quadrants of the positive and negative half cycles, respectively.

Rule 5, the application of gate drive at the occurrence of the peak of the applied network ac voltage is provided by the combination of two "one-shot" (monostable) circuits 210 and 212 and a dual input OR gate 214. Connected to the input of one-shot circuit 210 is the output 164 of the zero detector 162. Connected to the input of one-shot circuit 212 is the output 168 of the inverter 166. These two inputs to the one-shot circuits 210 and 212 are the signals B and $\bar{B}$, respectively. The "one-shot" circuits are used to generate short pulse outputs at the positivegoing edges of signals B and $\bar{B}$. These are outputs 216 and 218 of the circuits 210 and 212, respectively. The positive-going edges of signal B marks the positive peaks, whereas those of signal $\bar{B}$ marks the negative peaks of the applied network ac voltage. These two outputs 216 and 218 are shown in FIG. 9 as the signals PP and NP, respectively. The output of each one-shot circuit serves as an input of OR gate 214 whose output 220 represents the occurrence of either the positive or negative voltage peak of the applied ac voltage V.

The outputs of AND gates 190, 191, 192, and 193 are connected as inputs to OR gate 230. These inputs to the OR gate 230 will be present when the gate drive signal is to be removed during pre- and postpeak quadrants according to rules 1 or 2. Thus, the output 232 of the OR gate 230 represents a signal to stop or remove the gate drive signal, GDS. In a similar fashion, the outputs of AND gates 194, 195, 196, and 197 and the output of OR gate 214 are connected as inputs to OR gate 240. These inputs to OR gate 240 will be present when the gate drive signal, GDS, is to be applied or started during the pre- and postpeak quadrants and at the occurrence of voltage peaks according to rules 3, 4, or 5. The combination of the two outputs 232 and 242 of the OR gates 230 and 240, respectively, is used to generate the gate drive signal, GDS, 126. One means to produce the GDS, 126 is by use of a flip-flop. In FIG. 8 an RS flip-flop 250 is illustrated. The set input S, 252 is connected to the output 242 of OR gate 240 while the reset input R, 254 is connected to the output 232 of OR gate 230. The Q output 256 of the flip-flop 250 produces the gate drive signal GDS, 126. When the set input 252 is activated, the Q output will become active or go high applying the gate drive signal. When one of the stop or removal conditions occurs, the flip-flop 250 will be reset causing the output Q to become inactive thus removing the gate drive signal GDS, 126.

It is, of course, possible to implement the control of the proposed capacitor switching method by other circuit arrangements. The circuit of FIGS. 8A and 8B can be modified to provide only the output 242 of OR gate 240 as the gate drive signal GDS. It will be appreciated that the stop or removal conditions for the gate drive signal are mutually exclusive with the gate drive start conditions. Other modifications include generating the gate drive signal by the use of a microcomputer.

There are two major benefits of the switching method: (1) elimination of the large and expensive damping resistors, and (2) the reduction of the VAR generator operating losses. The first benefit reduces the cost of the VAR generator, the second reduces the operating expenses. Other embodiments of the invention will be apparent to those skilled in the art from consideration of the specification or from practice of the invention disclosed herein. It is intended that the specification be considered as exemplary only with the scope and spirit of the present invention being indicated by the following claims.

We claim:

1. In a static VAR generator for providing reactive power compensation to an ac network and including a thyristor-switched capacitor bank having a series combination of a capacitor, a bidirectional thyristor switch having gate drive, and a current limiting reactance with an applied voltage V appearing across the combination with a current being conducted therethrough and a voltage Vc appearing across the capacitor, a method for switching the thyristor switch to achieve damping of oscillatory transients generated by the switching of the capacitor in the network, comprising:
   determining the magnitude and polarity of a voltage difference $\Delta v$ defined by the formula $\Delta v = (V - Vc)$;
   determining the occurrence of the prepeak quadrant and the postpeak quadrant of the applied voltage V;
   removing the gate drive of the thyristor switch
   (a) during the prepeak quadrant of the applied voltage V when the polarity of $\Delta v$ is opposite to the polarity of the applied voltage V;
   (b) during the postpeak quadrant of the applied voltage V when the polarity of $\Delta v$ is the same as that of the applied voltage V; and
   applying the gate drive of the thyristor switch
   (a) during the prepeak quadrant of the applied voltage V when the polarity of $\Delta v$ is the same as the polarity of the applied voltage V;
   (b) during the postpeak quadrant of the applied voltage V when the polarity of $\Delta v$ is opposite to that of the applied voltage V; and
   (c) at the occurrence of the voltage peak of the applied voltage V.

2. In a static VAR generator for providing reactive power compensation to an ac network and including a thyristor-switched capacitor bank having a series combination of a capacitor, a bidirectional thyristor switch having gate drive, and a current limiting inductor with an applied voltage V appearing across the combination with a current being conducted therethrough, a method for switching the thyristor switch to achieve damping of oscillatory transients generated by the switching of the capacitor in the network, comprising:
   measuring the magnitude and polarity of the voltage Vc appearing across the capacitor;
   measuring magnitude and polarity of the applied voltage V;
   determining the magnitude and polarity of a voltage difference $\Delta v$ defined by the formula $\Delta v = (V - Vc)$;
   determining the occurrence of the prepeak quadrant and the postpeak quadrant of the applied voltage V;
   removing the gate drive of the thyristor switch during the occurrence of one of the following conditions:
   (a) during the prepeak quadrant of the applied voltage V when the polarity of $\Delta v$ is opposite to the polarity of the applied voltage V;
   (b) during the postpeak quadrant of the applied voltage V when the polarity of $\Delta v$ is the same as that of the applied voltage V; and
   applying the gate drive of the thyristor switch during the occurrence of one of the following conditions:
   (a) during the prepeak quadrant of the applied voltage V when the polarity of $\Delta v$ is the same as the polarity of the applied voltage V;
   (b) during the postpeak quadrant of the applied voltage V when the polarity of $\Delta v$ is opposite to that of the applied voltage V; and
   (c) at the occurrence of the voltage peak of the applied voltage V.

3. The method of claim 2 further comprising:
   comparing the magnitude of the current flow in the series combination with a predetermined current value; and
   removing the gate drive during the prepeak and postpeak quadrants of the applied voltage V during the stated conditions when the magnitude current flow is less than or equal to the predetermined current value.

4. The method of claim 2 further comprising applying and removing the gate drive during the prepeak and postpeak quadrants of the applied voltage V during the stated conditions for a predetermined number of cycles of the applied voltage V after switching the capacitor with the thyristor switch.

5. The method of claim 4 further comprising applying the gate drive continuously after the expiration of the predetermined number of cycles of the applied voltage.

6. In a static VAR generator for providing reactive power compensation to an ac network and including a thyristor-switched capacitor bank having a series combination of a capacitor, a bidirectional thyristor switch having gate drive, and a current limiting reactance with an applied voltage appearing across the combination with a current being conducted therethrough, a damping circuit for switching the thyristor switch to active damping of oscillatory transients generated by the switching of the capacitor in the network, comprising:
   first measuring means for measuring the magnitude and polarity of the voltage Vc appearing across the capacitor and producing a signal representative of the voltage Vc;
   second measuring means for measuring magnitude and polarity of the applied voltage V and producing a signal representative of the applied voltage V;
   difference means connected to the first and second measuring means for determining the magnitude and polarity of a voltage difference $\Delta v$ defined by the formula $\Delta v = (V - Vc)$ and producing a signal representative of the voltage difference v;
   quadrant sensing means connected to the second measuring means for determining the occurrence of the prepeak quadrant and the postpeak quadrant of the applied voltage V and producing a signal representative of the occurrence of prepeak and postpeak quadrants of the applied voltage V;
   gate drive control means for using the signals produced by the first and second measuring means, the difference means and the quadrant sensing means to remove and apply the gate drive to the thyristor switch on the occurrence of one of the following conditions, the gate drive control means removing the gate drive of the thyristor switch
  (a) during the prepeak quadrant of the applied voltage V when the polarity of Δv is opposite to the polarity of the applied voltage V;
  (b) during the postpeak quadrant of the applied voltage V when the polarity of Δv is the same as that of the applied voltage V; and
the gate drive control means applying the gate drive to the thyristor switch
  (a) during the prepeak quadrant of the applied voltage V when the polarity of Δv is the same as the polarity of the applied voltage V;
  (b) during the postpeak quadrant of the applied voltage V when the polarity of Δv is opposite to that of the applied voltage V; and
  (c) at the occurrence of the voltage peak of the applied voltage V.

7. The damping circuit of claim 6 further comprising:
current measuring means for determining the magnitude of the current in the capacitor bank and providing a current signal representative of the current;
a comparator having as inputs the current signal and a predetermined current reference signal value and an output when the current signal is less than or equal to the current reference signal with the gate drive control means being responsive to the output for removing the gate drive during the prepeak and postpeak quadrants of the applied voltage V during the occurrence of the output of the comparator.

8. The damping circuit of claim 6 further comprising cycle counter means for counting the cycles of the applied voltage V after the capacitor has been switched during the prepeak and postpeak quadrants of the applied voltage V and producing an output signal after the cycle count has exceeded a predetermined number of cycles after the switching of the capacitor with the thyristor switch with the gate drive control means being responsive to the output signal of the cycle counter means, the gate drive control means continuously applying the gate drive to the thyristor switch in response to the occurrence of the output signal of the cycle counter means.

* * * * *